3,096,777
INHIBITION OF DEPOSITION OF HYDROCARBONACEOUS SOLIDS FROM OIL
Christ F. Parks and Jacob E. Strassner, Tulsa, Okla., and Fred W. Burtch, Monroeville, Pa., assignors to The Dow Chemical Company, Midland, Mich., a corporation of Delaware
No Drawing. Filed Apr. 28, 1960, Ser. No. 25,212
4 Claims. (Cl. 137—15)

The invention is concerned with lessening the adhesion of hydrocarbonaceous deposits from oil, e.g., crude oil and its derivatives, deposited on the surface of equipment which is contacted by the oil.

The adhesion and accumulation of hydrocarbonaceous solids on the walls of oil-producing and oil-handling equipment has long been recognized as a major problem in the production, transfer, storage, and processing of petroleum and petroleum products. Although the invention is concerned with any equipment contacted by oil and, therefore, includes any surface affected thereby, e.g., the walls of metal tubing, pipe lines, pumping assemblies, valves, gauges, and storage tanks, for simplicity of expression such equipment hereinafter will be usually referred to as vessels.

Oil, as it first comes into contact with a restraining wall, e.g., the interior of a confining vessel, often contains certain hydrocarbonaceous substances which are in solution or otherwise flowable at the time of such first contact but subsequent thereto and prior to termination of the contact therewith are converted to non-flowable substances. Such substances are often deposited on the walls and form a tenaceous bond therewith and thereafter must be removed therefrom at considerable cost, inconvenience and lost time from production.

Although the character of the adhering deposit thus formed on the interior of the vessels varies somewhat, it consists largely of solidified hydrocarbons which have undergone a change of state from liquid to solid during a drop in temperature or rate of flow, or other altered condition which occurs during the contact with the walls of the vessel together with lesser amounts of substituted hydrocarbons, occluded oil, entrained water, sand, silt, and traces of other inorganic substances. The hydrocarbons are chiefly aliphatic (both straight and branched chain), aromatic, naphthenic, asphaltic, and small amounts of various resins. Because paraffin composes the largest percent of such hydrocarbonaceous depositions, they are often referred to broadly as paraffin wax, paraffin, or "rod wax." Paraffin wax is considered to have a melting point of between about 110° and 160° F. However, the paraffin waxes usually have intermixed therewith sufficient other waxes and resins which have higher molecular weight, longer length carbon atom chains per molecule, and higher average melting points (say of from about 150° to 200° F.) that the depositions have imparted thereto a particularly adhesive property. Such other waxes, often referred to broadly as resins, usually contain some complex molecular structures including oxygen, nitrogen, and sulfur combined therewith. The presence of such complex structures often render them particularly resistant to removal from the walls of the vessels to which they adhere.

Although a change in temperature is considered a fundamental cause for the deposition of hydrocarbonaceous solids, other factors are thought to contribute to such deposition, among which are: alternate coating and draining of oil from a surface, change in flow rate, change in agitation, presence of sand, silt, and water, roughness or smoothness of the confining surface, expansion of the more volatile constituents of the oils, liberation of such voltatile constituents from the oil, change in viscosity of the oil, and conditions (not too fully understood) that appear to encourage crystal growth of the paraffin and other solid hydrocarbonaceous substances, present in the oil, on the surfaces with which the oil comes in contact.

Hydrocarbonaceous deposits may be removed from surfaces by scraping with especially designed instruments, the procedure sometimes being referred to as "knifing." They may also be removed by passing hot oils, e.g., at a temperature of between 300° and 400° F., through the vessels from which the deposit is sought to be removed. Aside from the scraping being a particularly time-consuming and tedious task and the hot oil flush representing considerable cost in heating, pumping, and the like, neither method offers any prevention to the accumulation and continued formation of such deposits after such cleaning operation. The inconvenience and cost of such hydrocarbonaceous solid removal must be repeated at frequent intervals which makes their formation an especially serious problem.

Attempts have been made to render the walls of vessels contacted by oil less susceptible to the deposition and adherence of paraffinic substances contained in the oil onto the walls. One attempt comprises the steps of treating the walls with a mineral acid, thereafter forming on the acid-treated walls a water-insoluble salt comprising iron gallate, and coating the thus treated walls with a gelatinous silica layer. This method has apparent disadvantages inherent in carrying it out and is not so effective as is desired. Dissolution by such organic substances as $CS_2$ has also been employed with moderate but not fully satisfactory success.

There is a desideratum, therefore, in the production, transportation, storage, and processing of oil, for a satisfactory process for inhibiting the formation of adhering hydrocarbonaceous solids on the walls of vessels contacted by oil.

The present invention is a method of inhibiting the adhesion of solid hydrocarbonaceous substances deposited from oil on deposition-susceptible walls by the oil which consists of: contacting the said wall with a small but effective amount of an aqueous dispersion comprising a hydrophilic water-dispersible colloid-producing naturally-occurring polymeric substance which has been shown to maintain at least 30 percent of the area of a glass or a carbon steel coupon, e.g., plate or section of a ring, free of oil when subjected to the following test: (1) immersing a clean carbon steel or glass coupon in said aqueous solution of colloid-producing material at room temperature for 1 hour, (2) transferring the thus-treated coupon directly from the aqueous solution into crude oil at 160° F. containing 4 percent paraffin dissolved therein, (3) retaining the coupon therein for about 16 hours while allowing the crude oil-paraffin solution to cool to room temperature, (4) transferring the coupon from the oil-paraffin solution into the aqueous solution or dispersion of hydrophilic colloid-material to displace any oil or paraffin not firmly held on the surface thereof, and determining the percent of the total surface of said coupon which is free of oil.

The aqueous dispersion employed usually contains between 0.0025 and 1.0 percent by weight of the naturally occurring polymeric substance. To be water-dispersible for the purposes of the invention, the colloid-producing polymeric material should be dispersible in water to the extent of at least about 50 percent by weight within the range recommended.

Although the aqueous colloidal composition may be correctly considered either a dispersion or a solution according to the definitions thereof and varying circumstances (since it has some characteristics of both), it will be usually referred to herein as a dispersion.

The walls of the vessel or other equipment to be treated according to the invention to inhibit the adherence thereto of hydrocarbonaceous materials may have already become coated with hydrocarbonaceous material. In such instances, the hydrocarbonaceous material must be first removed by known means, e.g., scraping off by the use of knives or subjecting it to the action of hot oil at a temperature from about 200° to 400° F. to dissolve said material and flushing out the oil containing the dissolved hydrocarbonaceous substances. In the practice of the invention it is preferred that steam be blown through the vessel or against the walls to be treated according to the invention or the surfaces to be treated be flushed with an aqueous alkaline solution.

In the practice of the invention, if desired, the aqueous dispersion of the hydrophilic colloid may be made alkaline, i.e., may have the pH raised to a value greater than 7, by admixing an alkaline substance therewith, e.g., NaOH. However, the addition of an alkaline substance thereto is unnecessary to attaining the objects of the invention.

A further embodiment of the invention includes putting the equipment back into use, after contacting the interior surfaces thereof with the colloid-producing polymeric substance in accordance with the invention, and, subsequent thereto at periodic intervals, e.g., every 12 to 72 hours and usually between 24 and 48 hours, introducing into the oil contacting the surface of said equipment or vessel a small amount of the aqueous dispersion of a hydrophilic colloid. The amount of such aqueous dispersion of hydrophilic colloid to be added varies considerably, being dependent upon the type and concentration of the dispersion, the type of oil, the changes which the oil undergoes while in contact with the walls of the vessel, whether or not the oil is substantially static as in a tank or is moving as in a well tubing or pipe line wherein as a usual consequence of such movement oil in contact with a given section of the vessel is more-or-less continuously replaced by other oil. As little as one gallon of the aqueous dispersion, having a concentration of about 0.1 percent in water, per 100 barrels of oil, which is essentially static, is effective. In the case of moving oil as in a well producing about 100 barrels of oil per day, 1 gallon of 0.1 percent concentration of such aqueous hydrophilic colloid per day is effective. Between 0.2 and 20 gallons of an aqueous hydrophilic dispersion, containing between 0.1 and 2.5 pounds of the colloid-producing substance, per gallon of dispersion per 100 barrels of oil per day is recommended. A barrel herein equals 42 gallons. As illustrative of the practice of the invention, between about 1 and 3 gallons of the aqueous dispersion containing between 1 and 2 pounds of the colloid-producing substance per gallon may be admixed per 100 barrels of oil.

A number of hydrophilic colloid-producing polymeric materials are satisfactory to prepare the aqueous dispersion for the practice of the invention. Among such hydrophilic colloid-producing substances are blood albumin, egg albumin, salts of lignosulfonic acid, propylene glycol-treated algin, gelatin, disaccharides such as amylose, gum arabic, saponin, Irish moss, and such proteinaceous substances as casein and brown and white animal glue.

The term, naturally occurring polymeric substances, as used herein includes acid-treated polymers and the water-dispersible colloid-producing salts thereof, e.g., the alkali metal salts of lignosulfonic acid. Glues, gum arabic, amylose, gelatin, blood albumin, and egg albumin, have been found to form dispersions more readily and, in many instances be rendered more effective, by admixing therewith an alkaline substance, e.g., about 0.1 percent aqueous solution of sodium hydroxide. A pH of any value over 7, including all pH values up to 14, is usually employed with such substances. However, such aqueous hydrophilic colloid dispersions as saponin have been found more effective at a pH of 5 or 6 than at higher pH values and dispersions of egg albumin having a pH of 5 have been found very effective although its effectiveness when the pH value was raised to 7 and then to 9 was found to be progressively increased. One of the most effective hydrophilic colloid-producing substances employed at low concentration was blood albumin which was found highly effective at a concentration as low as 0.0025 percent.

The following two tests are set forth for the purpose of determining which hydrophilic water-dispersible colloid-producing polymeric substances are satisfactory for the practice of the invention. One test consists of preparing an aqueous dispersion of a hydrophilic colloid-producing substance and putting 50 milliliters thereof at room temperature in a 100 milliliter graduate. A test coupon consisting of a rectangular glass plate, hereinafter more fully described, is suspended by means of a non-contaminating supporting strand in the aqueous dispersion of the hydrophilic colloid for 1 hour. Thereafter, substantially pure paraffin obtained from crude oil (such as is described hereinafter) is admixed with 50 milliliters of crude oil having an A.P.I. gravity of 37° and at a temperature of 160° F., in an amount sufficient to produce a 4 percent paraffin dispersion in the crude oil. The paraffin-enriched crude oil is then placed in the graduate above the 50 milliliters of aqueous dispersion thereby forming a lower aqueous and an upper oil phase. The glass plate is then pulled up (by means of the strand) into the heated crude oil solution of paraffin and retained submerged therein for 16 hours, while allowing the oil to cool to room temperature after which the plate or section is lowered back into the aqueous hydrophilic colloid dispersion again, allowed to stand there for 1 minute to remove any oil or paraffin not firmly adhering to the surface of the coupon, and the percent of surface area of the plate which is oil-free determined.

The glass coupons employed in the test were 1" x 3" x 0.31" in size and had a total combined surface area of about 8.5 square inches. They were prepared for the tests by thoroughly cleaning by dipping them for 1 hour in a liter of a glass-cleaning solution consisting of 35 milliliters of a saturated aqueous solution of $Na_2Cr_2O_7$ admixed with 965 milliliters of concentrated $H_2SO_4$, and thereafter rinsing the thus-treated glass coupons with distilled water, and drying at 180° F. for 2 hours.

The other test, which may be used as an alternative for ascertaining suitability of the hydrophilic substance for use in the invention, is similar to the test above described but employs sections of an annular ring as the test coupon and employs 100 milliliters of the aqueous dispersion of hydrophilic substance and 100 milliliters of crude oil. The test is otherwise the same as the test above.

The metal ring coupons when employed in the test were sections prepared by cutting 1-inch long rings from a pipe which was 2⅜ inches in outside diameter and has a wall thickness of 7/32 inch. The pipe was of A.P.I. P105 carbon steel (which is commonly employed in oil well steel tubing). The rings thus made were then divided into quarter-section coupons and prepared for testing by dipping them in a crude oil at 160° for 1 hour, removing the thus treated coupons therefrom, and subjecting them to the action of a 2 percent aqueous solution of sodium hydroxide at 100° F. for 5 minutes to remove the oily layer.

The paraffin which was admixed with the crude oil in the preparation of the materials for use in the tests was prepared by taking a crude oil known to contain a high percent of paraffin, heating it in a vessel at a temperature between 200° F. and 250° F. to drive off water contained therein and to allow the silt and sand therein to deposit from the thus melted paraffin, and thereafter allowing the paraffin to stand for about an hour to cool and solidify. The top 95 percent of the thus melted and solidified paraffin was separated leaving behind most of the sand and silt. The paraffin thus removed was again heated to between 200° and 250°, to drive off any water remaining therein and to allow any remaining sand or silt therein to settle to the bottom. The paraffin was again allowed to solidify and the upper 95 percent used as the paraffin later added to the crude oil in the tests.

A series of tests was run employing glass coupons to ascertain the effect thereon of subjecting them to the action of various hydrophilic colloid dispersions employed in the practice of the invention dispersed in a 15 percent "synthetic" brine prepared by dissolving therein: 519.8 grams of $CaCl_2$, 2400.3 grams of NaCl, and 325.6 grams of $MgCl_2 \cdot 6H_2O$ in enough water to make 5 gallons. The pH of the resulting brine was 5 and the specific gravity at 75° F. was 1.11. The brine dispersions were all 0.1 percent by weight dispersions of the colloid-producing substances. Each test was repeated except that 0.1 percent by weight of NaOH was also dissolved therein. Two tests of the series were run for comparative purposes, the first test employing synthetic brine only and the second test had only synthetic brine containing NaOH present. The results of the tests of this series are set out in Table I which follows:

TABLE I

| Agent Added to 15 Percent Synthetic Brine to Make 0.1 Percent by Weight Dispersion | Amount of NaOH Added to Make 0.1 Percent by Weight In Dispersion | Surface Area of Coupon Free of Oil |
|---|---|---|
| None | None | 0 |
| Do | 0.1 | 0 |
| Brown Glue | None | 75 |
| Do | 0.1 | 60 |
| White Glue | None | 90 |
| Do | 0.1 | 90 |
| Gum Arabic | None | 85 |
| Do | 0.1 | 70 |
| Superlose (amylose) | None | 90 |
| Do | 0.1 | 85 |
| Gelatin | None | 70 |
| Do | 0.1 | 60 |
| Egg Albumin | None | 85 |
| Do | 0.1 | 90 |
| Blood Albumin | None | 99 |
| Do | 0.1 | 99 |
| Marasperse N [1] | None | 95 |
| Do [1] | 0.1 | 95 |
| Kelcoid LV [2] | None | 99 |
| Casein [3] | None | 30 |

[1] Product of Marathon Corporation, Chemical Division; a salt of sulfonated lignin.
[2] Product of Kelco.; a propylene glycol-treated algin. Kelcoid was not improved by admixing therewith 0.1 percent NaOH.
[3] Casein was not improved by admixing therewith 0.1 percent NaOH An examination of Table I shows that subjecting a cleaned surface to the action of a brine dispersion of a hydrophilic colloid polymeric substance in accordance with the teachings of the invention renders the surface thus treated resistant to the adhesion thereto of hydrocarbonaceous solids of the nature of paraffin. Although no apparent improved result is shown when dispersions are make alkaline, the results are comparable, and the alkaline solutions in some instances enable the colloidal dispersion or solution to be made up in less time.

Some of the runs set forth in Table I were then repeated substantially according to the same procedure above, but employing the metal ring sections described hereinabove instead of the glass coupons. The results, other than showing a wider range of results from those obtained with the glass coupons, showed the same colloid-producing polymeric substances to be useful in the practice of the invention.

Additional tests were then run to show the effect on inhibiting paraffinic depositions on glass coupons by varying the concentration of the hydrophilic colloid-producing substance in the brine dispersion. The percent concentration of the hydrophilic colloid dispersion and the percent area of the coupon immersed therein, which was free of oil as determined by the tests, are set out in Table II below.

TABLE II

| Agent Added in Percent by Weight to 15 Percent Synthetic Brine To Make Dispersion | Percent of Surface Area Free of Oil |
|---|---|
| 0.001 percent Saponin | 0 |
| 0.01 percent Saponin | 10 |
| 0.01 Saponin 0.01 percent NaOH | 5 |
| 0.01 percent Egg Albumin | 70 |
| 0.001 percent Egg Albumin | 35 |
| 0.01 percent Blood Albumin | 99 |
| 0.0075 percent Blood Albumin | 96 |
| 0.0050 percent Blood Albumin | 99 |
| 0.0025 percent Blood Albumin | 85 |

An examination of Table II shows that the various hydrophilic colloid-producing polymeric substances vary somewhat in their effectiveness, for example, 0.001 percent egg albumin and as little as 0.0025 blood albumin were highly effective whereas 0.01 percent saponin was not so effective.

Since brine of various concentrations, particularly containing chlorides of calcium, sodium, and magnesium, are often found associated with the production of petroleum and since such brines come in contact with metal oil-well equipment, including the tubing up through which the oil is forced during production, a substance effective to prevent the adherence of hydrocarbonaceous solids to the interior of such equipment should also be effective in the presence of such brines. The series of tests of Table I and Table II were, therefore, run using the hydrophilic colloid-producing substance employed in the invention dispersed in a synthetic brine. In these tests it was found the substances were not precipitated by contact with the brine and are generally operable in its presence. Further tests substantiated the results of Tables I and II and showed the substances are similarly compatible with fresh water and a 10 percent NaCl brine. The tests were conducted by employing glass slides or coupons as in the first of the tests set out hereinbefore except, that in each test of Table III, 0.1 percent of the hydrophilic colloid substance was dispersed in each of: water, a 10 percent NaCl brine, and the 15 percent "synthetic" brine prepared as described earlier.

The effectiveness of the colloid dispersed in water and in the two brines to prevent adherence of paraffin to glass coupons was then ascertained according to the procedure followed for the tests of Tables I and II. The results are set out in Table III below.

TABLE III

| Agent Added to Water and Brine To Make 0.1 Percent by Weight Dispersion | Percent of Surface Area Free of Oil Using— | | |
|---|---|---|---|
| | Fresh Water | 10 Percent NaCl Brine | 15 Percent Synthetic Brine |
| None | 0 | 0 | 0 |
| Saponin | 5 | 95 | 99 |
| Gelatin | 10 | 70 | 45 |
| Egg-Albumin | 70 | 90 | 85 |
| Irish Moss | 5 | 40 | 60 |

An examination of the results set out in Table III shows that the hydrophilic colloid is more effective in the brine in all instances than in fresh water. This phenomenon is particularly advantageous in the practice of the invention since various brines similar to those shown in Table III are encountered in petroleum production.

The tests of Table III were repeated except that sections of carbon steel, designated P105 and commonly employed in oil-well tubing, were employed instead of the glass coupons. The results obtained correlated closely with those obtained when glass coupons were used except that greater variation in results were found to exist when the steel was used. The tests employing the steel sections as coupons, however, showed that the practice of the invention was highly effective to inhibit the deposition of adherent hydrocarbonaceous material on steel. It is concluded from the tests run that any hydrophilic colloid naturally-occurring polymeric substance, which when brought in contact with the surface of either a clean glass or carbon steel coupon as an aqueous solution or dispersion thereof in accordance with the testing procedure outlined above results in maintaining 30 percent or more of the surface of the coupon free of oil, is a satisfactory hydrophilic colloid substance to employ in the practice of the invention. It is suggested, however, that for the purpose of ascertaining suitability of a colloid-producing material for use in the practice of the invention, glass coupons be employed since the results obtained by tests thus run can be more nearly duplicated.

The following examples are illustrative of the practice of the invention.

*Example 1*

An oil well in Ector County, Texas, producing from the San Andreas formation, having a depth of 5760 feet was producing an average of 36 barrels of oil and 4 barrels of water per day. Every 30 days the paraffin build-up on the well tubing was so great that production was stopped and the paraffin removed by either hot oil treatment or hot oil supplemented by carbon disulfide treatment.

To alleviate this relatively frequent periodic treatment, the well was treated in accordance with the invention as follows:

The accumulated paraffin deposits were scraped from the well tubing by the use of conventional paraffin-removing knives. Thirty gallons of a 30 percent by weight aqueous solution of NaOH containing 100 pounds of trisodium phosphate dissolved therein were admixed with 222 gallons of water containing 0.8 pound of gum arabic dispersed therein. The resulting 252 gallons of aqueous alkaline composition were then heated to 190° F. and pumped down the well tubing and maintained therein for 4 hours.

The aqueous alkaline composition was then pumped from the well and the well put back in production. Thereafter, each day, 1 gallon of an aqueous dispersion consisting of 0.08 pound of gum arabic per gallon of water was pumped down the annulus and fed into the tubing near the bottom thereof. The well was continued in production and the daily treatment continued, over a period of 60 days after which the tubing was tested for paraffin build-up. No noticeable paraffin build-up was found.

*Example 2*

An oil well in the same field of Ector County as that treated as described in Example 1 and producing from the same formation at a depth of 5766 feet, at an average rate of 28.5 barrels of oil and 4 barrels of water per day, was giving similar trouble to the well of Example 1 due to paraffin build-up. Every 30 days, the well was taken out of production and treated with hot oil to dissolve the paraffin. A need clearly existed for a way of lessening the frequency of the hot oil treatments.

To satisfy this need, the well was treated according to the invention as follows:

The accumulated paraffin deposits were scraped from the well tubing as in Example 1 and thereafter an aqueous solution of the type employed in Example 1, but wherein 3 pounds of Marasperse N (the sodium salt of lignosulfonic acid) were admixed therein instead of the gum arabic, was prepared, heated to 190° F., pumped into the well tubing, and maintained therein for 4 hours. The alkaline solution was then removed and the well put back into production. Thereafter, each day, 1 gallon of an aqueous dispersion consisting of 0.3 pound of Marasperse N per gallon of water was pumped down the annulus and fed into the tubing near the bottom thereof. The well continued in production for two months after which it was examined for paraffin build-up. No noticeable paraffin was found.

The freedom of paraffin deposition on the walls of the tubing of the wells treated in Examples 1 and 2 demonstrate the efficacy of the treatment of the tubing and of the oil subsequently passing therethrough with the aqueous dispersion of hydrophilic colloid producing polymeric substance in accordance with the invention.

Although vessels for confining paraffin-depositing oil, e.g., oil-well tubing, are advantageously treated both before passing oil therethrough and subsequently while passing it therethrough, the invention contemplates treatment of the vessel either before use or subsequently during use but not necessarily both. However, when the walls of the vessel are not treated with the colloid-producing dispersion in accordance with the invention, all adhering paraffin must be first removed and the surface treated with an alkaline solution, e.g., one containing trisodium phosphate or NaOH or both.

A number of advantages are apparent from the practice of the invention prominent among which is effectively avoiding, at low cost and at relatively small inconvenience, the serious adverse effects on production rates and operating expenses due to the deposition and adhesion of hydrocarbonaceous solids on the walls of equipment coming in contact with oil containing such hydrocarbonaceous material in solution or suspension for protracted periods of time. Unless adequate preventive steps are taken to inhibit such deposition and adhesion, relatively frequent shut-downs and time-consuming and costly removal steps must be taken to dissolve and flush out or mechanically scrape away such adhering deposition.

Having described the invention, what is claimed and desired to be protected by Letters Patent is:

1. The method of inhibiting the adhesion of solid hydrocarbonaceous material deposited from oil containing such substances in solution and suspension on a deposition-susceptible surface of equipment with which such oil comes in contact which comprises subjecting the surface thus contacted to the action of an aqueous dispersion containing at least about 0.0025 percent of a water-dispersible hydrophilic colloid-producing polymeric substance selected from the class consisting of animal glue, gum arabic, amylose, gelatin, egg albumin, blood albumin, alkali metal salts of lignosulfonic acid, glycol-treated algin, saponin, Irish moss, and casein.

2. The method of inhibiting the adhesion of solid hydrocarbonaceous substances deposited from oil containing such substances in solution and suspension on the inter surface of pipes, tubing, and vessels contacted by said oils flowing therethrough which comprises admixing with said oil an aqueous dispersion consisting essentially of between 0.1 and 2.5 pounds of a hydrophilic water-dispersible colloid-producing polymeric substance selected from the class consisting of animal glue, gum arabic, amylose, gelatin, egg albumin, blood albumin, alkali metal salts of lignosulfonic acid, glycol-treated algin, saponin, Irish moss, and casein per gallon of the dispersion in an amount of the dispersion so made to provide between about 0.2 and about 20.0 gallons per 100 barrels of the oil periodically between about 12 and 72 hour intervals.

3. The method of inhibiting hydrocarbonaceous substances suspended and dissolved in oil from depositing as hard tenaciously adhering solids on the walls of equipment with which such oil comes in contact which comprises substantially removing adhering foreign substances from such surfaces, flushing said surfaces thus freed from foreign substances, with an aqueous dispersion containing between 0.0025 and 1.0 percent of a hydrophilic water-dispersible colloid-producing polymeric substance selected from the class consisting of animal glue, gum arabic, amylose, gelatin, egg albumin, blood albumin, alkali metal salts of lignosulfonic acid, glycol-treated algin, saponin, Irish moss, and casein.

4. The method of claim 3 wherein the surface from which adhering foreign substances have been removed is treated with an aqueous alkaline solution equivalent to at least a 5 percent solution of NaOH to render the surfaces water-wettable prior to subjecting said surfaces to the action of the aqueous solution of the hydrophilic colloid-producing material.

References Cited in the file of this patent

UNITED STATES PATENTS

| | | |
|---|---|---|
| 1,892,205 | De Groote | Dec. 27, 1932 |
| 2,470,831 | Monson | May 24, 1949 |
| 2,602,778 | Snyder et al. | July 8, 1952 |
| 2,771,420 | Rowe | Nov. 20, 1956 |
| 2,818,079 | Garrison | Dec. 31, 1957 |
| 2,828,258 | Thompson | Mar. 25, 1958 |
| 2,927,078 | Nathan | Mar. 1, 1960 |